(12) United States Patent
Tukker et al.

(10) Patent No.: US 8,337,044 B2
(45) Date of Patent: Dec. 25, 2012

(54) ELONGATED LUMINAIRE COMPRISING LEDS FOR ILLUMINATING OBJECTS IN FRONT OF THE LUMINAIRE

(75) Inventors: Teunis Willem Tukker, Eindhoven (NL); Denis Joseph Carel Van Oers, Eindhoven (NL); Wilhelmus Adrianus Gerardus Timmers, Eindhoven (NL); Edwin Van Lier, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 159 days.

(21) Appl. No.: 12/738,313

(22) PCT Filed: Oct. 20, 2008

(86) PCT No.: PCT/IB2008/054307
§ 371 (c)(1),
(2), (4) Date: Apr. 16, 2010

(87) PCT Pub. No.: WO2009/053891
PCT Pub. Date: Apr. 30, 2009

(65) Prior Publication Data
US 2010/0232156 A1    Sep. 16, 2010

(30) Foreign Application Priority Data
Oct. 25, 2007    (EP) .................................... 07119253

(51) Int. Cl.
*F21V 1/00*    (2006.01)
*F21V 11/00*   (2006.01)

(52) U.S. Cl. .............. 362/235; 362/217.02; 362/217.04; 362/227

(58) Field of Classification Search .................. 362/235, 362/217.01, 219, 217.05, 217.06, 217.07, 362/217.1, 227, 230, 231, 237, 238, 240, 362/241, 243, 245, 247, 249.02
See application file for complete search history.

(56) References Cited

U.S. PATENT DOCUMENTS

| | | | | |
|---|---|---|---|---|
| 4,599,684 | A | * | 7/1986 | Lee ................................ 362/346 |
| 4,747,027 | A | * | 5/1988 | Rieger .......................... 362/297 |
| 4,796,168 | A | * | 1/1989 | Peterson ....................... 362/225 |
| 5,607,227 | A |   | 3/1997 | Yasumoto et al. |
| 6,641,282 | B2 | * | 11/2003 | Perlo et al. ............... 362/217.06 |
| 7,083,313 | B2 | * | 8/2006 | Smith ............................ 362/555 |
| 2003/0021110 | A1 | * | 1/2003 | Noh .............................. 362/217 |
| 2003/0165061 | A1 | * | 9/2003 | Martineau ..................... 362/297 |
| 2004/0105262 | A1 |   | 6/2004 | Tseng et al. |

(Continued)

FOREIGN PATENT DOCUMENTS
BE    545393    3/1956
(Continued)

*Primary Examiner* — Danielle Allen
(74) *Attorney, Agent, or Firm* — Mark L. Beloborodov

(57) ABSTRACT

An elongated luminaire for illuminating objects in front of the luminaire, comprising a plurality of side emitting LEDs (1) in only one straight array mounted on an elongated base plate (2). The base plate (2) carries two elongated reflectors (3) extending on either side of the array of LEDs (1) and parallel to the array of LEDs (1). Each reflector (3) has a reflecting surface (4) directed towards the array of LEDs (1).

5 Claims, 3 Drawing Sheets

U.S. PATENT DOCUMENTS

| | | |
|---|---|---|
| 2005/0111220 A1* | 5/2005 | Smith .......................... 362/235 |
| 2005/0265019 A1 | 12/2005 | Sommers et al. |
| 2006/0198144 A1 | 9/2006 | Miyairi et al. |
| 2006/0221611 A1* | 10/2006 | Noh et al. .................... 362/247 |
| 2006/0262424 A1 | 11/2006 | Choi |
| 2007/0195535 A1 | 8/2007 | Artwohl et al. |
| 2008/0253119 A1* | 10/2008 | Paulussen et al. ............ 362/245 |
| 2008/0278943 A1* | 11/2008 | Van Der Poel ............... 362/240 |
| 2009/0316414 A1* | 12/2009 | Yang et al. ................ 362/296.01 |

FOREIGN PATENT DOCUMENTS

| | | |
|---|---|---|
| EP | 1376708 A2 | 1/2004 |
| EP | 1758068 A1 | 2/2007 |
| WO | 03102467 A | 12/2003 |

* cited by examiner

ELONGATED LUMINAIRE COMPRISING LEDS FOR ILLUMINATING OBJECTS IN FRONT OF THE LUMINAIRE

FIELD OF THE INVENTION

The invention relates to an elongated luminaire for illuminating objects in front of the luminaire, comprising a plurality of LEDs (Light Emitting Diodes) in only one straight array mounted on an elongated base plate.

BACKGROUND OF THE INVENTION

Such an elongated luminaire is disclosed in EP-A-1758068, which publication describes a luminaire provided with an elongated lens extending parallel to the array of LEDs, whereby the array of LEDs and the lens have a common longitudinal plane of symmetry. The array of LEDs is arranged along a longitudinal axis. The luminaire comprises an elongated U-shaped body, the bottom of the body being provided with the straight array of LEDs. The elongated lens is clamped between the legs of the U-shaped body, in order to obtain the desired beam of light emitted by the luminaire.

Luminaires comprising a plurality of LEDs can be used as an alternative to conventional light sources, thus being capable of replacing typical fluorescent and incandescent luminaires. LEDs can emit bright light radiation, and a luminaire comprising a number of LEDs can be designed in such way that its light radiation is similar to or improved with respect to the light radiation of a conventional fluorescent or incandescent luminaire. The term "improved" here relates to a better horizontal uniformity.

In particular, the invention is related to an elongated luminaire for illuminating merchandise in a freezer cupboard having a number of neighboring transparent doors at its front side. Each door can hinge about a vertical axis, or can be shifted in its plane in the horizontal direction, so that the merchandise is approachable for a person who opens the door. The elongated luminaires are mounted behind the door cheeks or mullions, i.e. the vertical posts or jambs along both vertical edges of the doors when the doors are closed. The doors are hingingly connected with the door cheeks, and, in case of shifting doors, the doors can shift in front of the door cheeks. The luminaires illuminate merchandise behind the doors, such that the light beams of the luminaires behind two neighboring door cheeks overlap each other in order to illuminate the merchandise from two sides.

According to the prior art, the merchandise is illuminated by means of tube-like fluorescent luminaires mounted behind the door cheeks. When an array of LEDs is used for illuminating the merchandise, in particular LEDs having bright light radiation, the distance between the LEDs in the array will be substantial, for example 15 cm or more. Such a relatively large distance may result in a less uniform illumination of the objects in front of the luminaire.

SUMMARY OF THE INVENTION

An object of the invention is to provide an elongated luminaire comprising a plurality of LEDs in a straight array, which luminaire can illuminate objects located in front of the luminaire, resulting in the uniformity of the illumination of these objects being improved.

Another object of the invention is to provide an elongated luminaire comprising a plurality of LEDs in a straight array, wherein commercially available LEDs are used having a specific radiation pattern, and reflectors in the luminaire provide for a uniform illumination of objects in front of the luminaire.

Another object of the invention is a freezer cupboard having at least one transparent door at its front side, and the merchandise in the freezer is evenly illuminated by means of LEDs.

Another object of the invention is a freezer cupboard having at least one transparent door at its front side, and the merchandise in the freezer is illuminated by means of LEDs, such that glare and light radiation towards a person in front of the cupboard freezer is prevented.

To accomplish one or more of these objects, the LEDs in the luminaire are side emitting LEDs, and the base plate carries two elongated reflectors extending on either side of the array of LEDs and parallel to the array of LEDs, whereby each reflector has a reflecting surface directed towards the array of LEDs. The two reflectors can be separate members and connected to the elongated base plate by a welding operation or clamping means or by means of glue. The base plate and the reflectors can also be integrated into one component of the luminaire, i.e. made out of one piece of material. Furthermore, the base plate can have reflecting properties in order to recycle light with a backward scattering component.

Side emitting LEDs are commercially available, and are disclosed, for example, in publications EP-A-1376708 and US-A-2006/0262424. Such a side emitting LED is a LED which is integrated in an optical structure, such that the light radiation is emitted mainly sideward, i.e. substantially in radial directions around the central axis of the LED, and the light radiation diverges more or less relative to a plane perpendicular with respect to said central axis. The expression "side emitting LED" includes an LED with a lambertian radiation profile combined with a dedicated secondary optic for producing sideward emitted light radiation. The application of side emitting LEDs makes it possible to make use of reflectors, directing the light radiation to objects in front of the luminaire. Thereby, an appropriate distribution of the light radiation can be obtained in order to illuminate the objects in front of the luminaire in a proper manner. The resulting distribution of light radiation at least substantially is a batwing light distribution in cross section when viewed along the longitudinal axis.

In a preferred embodiment, the reflecting surface of each reflector is profiled, with the main part of the surface being inclined with respect to a direction parallel to the longitudinal direction of the reflector, i.e. parallel to the array of LEDs. The expression 'profiled' means that portions of the reflective surface of the reflector protrude and/or are recessed with respect to the plane of the reflecting surface. In fact, the plane is the average of the location of the reflecting surface. Preferably, the reflecting surface of the reflectors is undulated in the longitudinal direction of the elongated luminaire. Therefore, the objects in front of the luminaire are illuminated more evenly, because each portion of the reflecting surface distributes the light radiation in many directions. As many multiple-mirrored images are created, a sort of virtually continuous light source is obtained. As a result, the mutual distance between the LEDs can be relatively large. The undulations can be realized on a macroscopic or microscopic scale or holographically.

In a preferred embodiment, the reflecting surface of each of the reflectors diverge with respect to each other by an angle between 0° and 60°, more preferably between 0° and 30°. So, the angle between the base plate and the reflecting surfaces is between 60° and 90°, preferably between 75° and 90°. Thereby, the diverging reflecting surfaces direct the light radiation more or less to the front side of the luminaire, i.e.

towards the objects to be illuminated. The cross sectional shape of the surface of the reflectors can be optimized to obtain the desired light distribution in front of the luminaire.

In a preferred embodiment, the reflecting surface of each of the reflectors extends substantially in a plane parallel to the plane of symmetry through the array of LEDs, so they do not diverge with respect to each other. In particular, when the LEDs direct the light radiation sideward at an angle below 90° with respect to the axis of the LED in forward direction, the mutual parallel position of the reflecting surfaces provides for an appropriate light radiation of the luminaire.

In a preferred embodiment, the distance between the base plate and an edge of the reflector facing away from the base plate is at least three quarters of the length of the LEDs. The length of the LED is the distance between the base plate and the top of the LED, measured along its central axis, i.e. perpendicular to the surface of the base plate of the luminaire. Thereby an effective light reflection will occur. Preferably, the distance between the base plate and the edge of the reflector facing away from the base plate is substantially equal to the length of the LEDs. Thereby, all directions of the light radiation from the luminaire have a forward component, i.e. to the front side of the luminaire, while backward radiated light, or glare, is prevented, which is important when the luminaire is used for illumination of merchandise in a cupboard freezer.

Preferably, a transparent cover plate is present on the side of the luminaire opposite to the base plate, interconnecting the edges of the reflectors facing away from the base plate. The cover can be flat or slightly curved. Thereby, the LEDs and the reflecting surfaces are protected against pollution. Furthermore, the luminaire can be cleaned easily, because the outside of the luminaire can be made smooth.

The invention is also related to a freezer cupboard having at least one transparent door at its front side, with elongated luminaires as described above being mounted behind the two vertical door cheeks of the door in order to illuminate merchandise in the freezer cupboard, and the light beams of the luminaires near both vertical edges of the door overlapping each other. Thereby, the merchandise inside the cupboard freezer can be illuminated properly, even in case it is located near the luminaire, for example closer than one centimeter or less.

In a preferred embodiment, a number of neighboring transparent doors at the front side of the cupboard are present, with elongated luminaires being present behind at least three vertical door cheeks of at least two neighboring doors.

BRIEF DESCRIPTION OF THE DRAWINGS

The invention will now be further elucidated by means of a description of two embodiments of the luminaire and its application, with reference being made to the drawing comprising five diagrammatical figures, wherein.

The figures are very schematic representations, only showing parts that contribute to the elucidation of the embodiments of the invention, and showing only parts that are relevant for the understanding of the invention. For example, means for supplying electric power to the LEDs are not represented in the figures.

DESCRIPTION OF PREFERRED EMBODIMENTS

Figure 1:
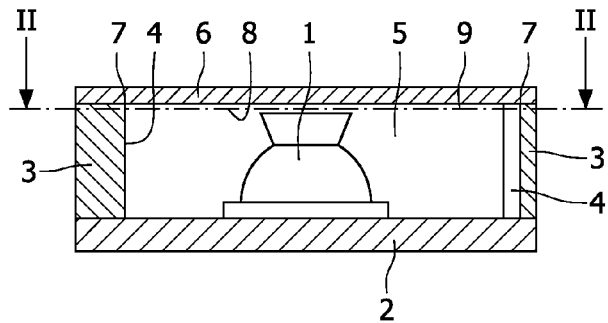
FIG. 1 shows the first embodiment of the luminaire in a sectional view according to the line I-I in FIG. 2.
Figure 2:
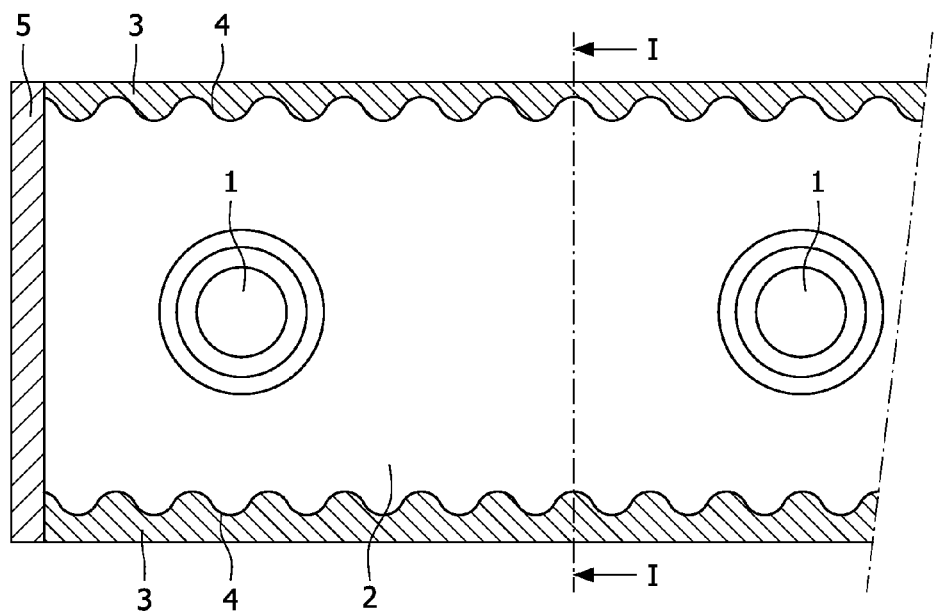
FIG. 2 is a sectional view of the luminaire according to line II-II in FIG. 1.

FIG. 1 is a transverse cross-sectional view of the first embodiment of the elongated luminaire according to the invention, as is indicated with arrows I in FIG. 2. FIG. 2 is a longitudinal cross-sectional view, indicated in FIG. 1 with arrows II. Only a part of the luminaire is represented, including one of the two ends of the luminaire. The elongated luminaire is provided with a number of side emitting LEDs 1 mounted in a straight array on a strip-like elongated base plate 2. The distance between the LEDs may be about 15 cm or more, but the mutual distance may also be much smaller, for example 1 cm or less.

Figure 3:
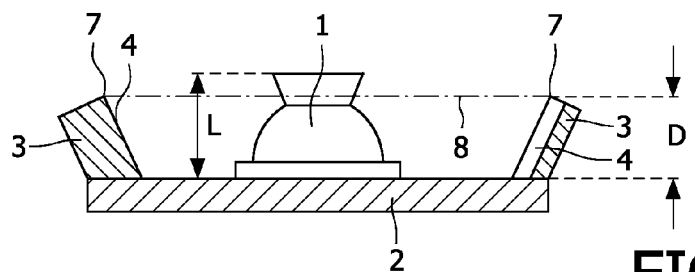
FIG. 3 shows the second embodiment of the luminaire in a sectional view.

Two elongated reflectors 3 are fixed to the base plate 2, for example by means of glue. The reflecting surfaces 4 of the two reflectors 3 are undulated in the longitudinal direction of the luminaire. Therefore, the light radiation is reflected in many directions by each portion of the reflecting surface 4. Each reflector 3 has an edge 7 facing away from the base plate 2. The edges 7 both define and border a light emission window 8; the LEDs 1 optionally may extend through the light emission window (FIG. 3). The luminaire is designed to illuminate objects in front of the luminaire, i.e. illuminate objects that are positioned on a side 9 of the light emission window 8 facing away from the base plate 2.

At both ends of the luminaire, the base plate 2 has an upright portion 5, one of which is represented in the FIGS. 1 and 2. A transparent cover 6 is connected to the edges of the reflectors 3 facing away from the base plate 2. Therefore, the LEDs 1 are located in an elongated, closed housing formed by the elongated base plate 2, the two reflectors 3 and the cover 6.

FIG. 3 shows the second embodiment of the luminaire corresponding to the representation in FIG. 1, and using the same reference numbers for similar parts. In the second embodiment, the two reflectors 3 are positioned so as to diverge with respect to each other in a direction away from the base plate 2. Therefore, the light radiation from the LEDs 1 is reflected by the undulated reflecting surfaces 4 in a more forward direction with respect to the luminaire. The reflectors 3 each have an edge 7 facing away from the base plate 2. The distance D between said edge 7 and the base plate 2 is about 80% of the length L of the LED 1 (in FIG. 1 this distance D is about 110% of the length L).

Figure 4:
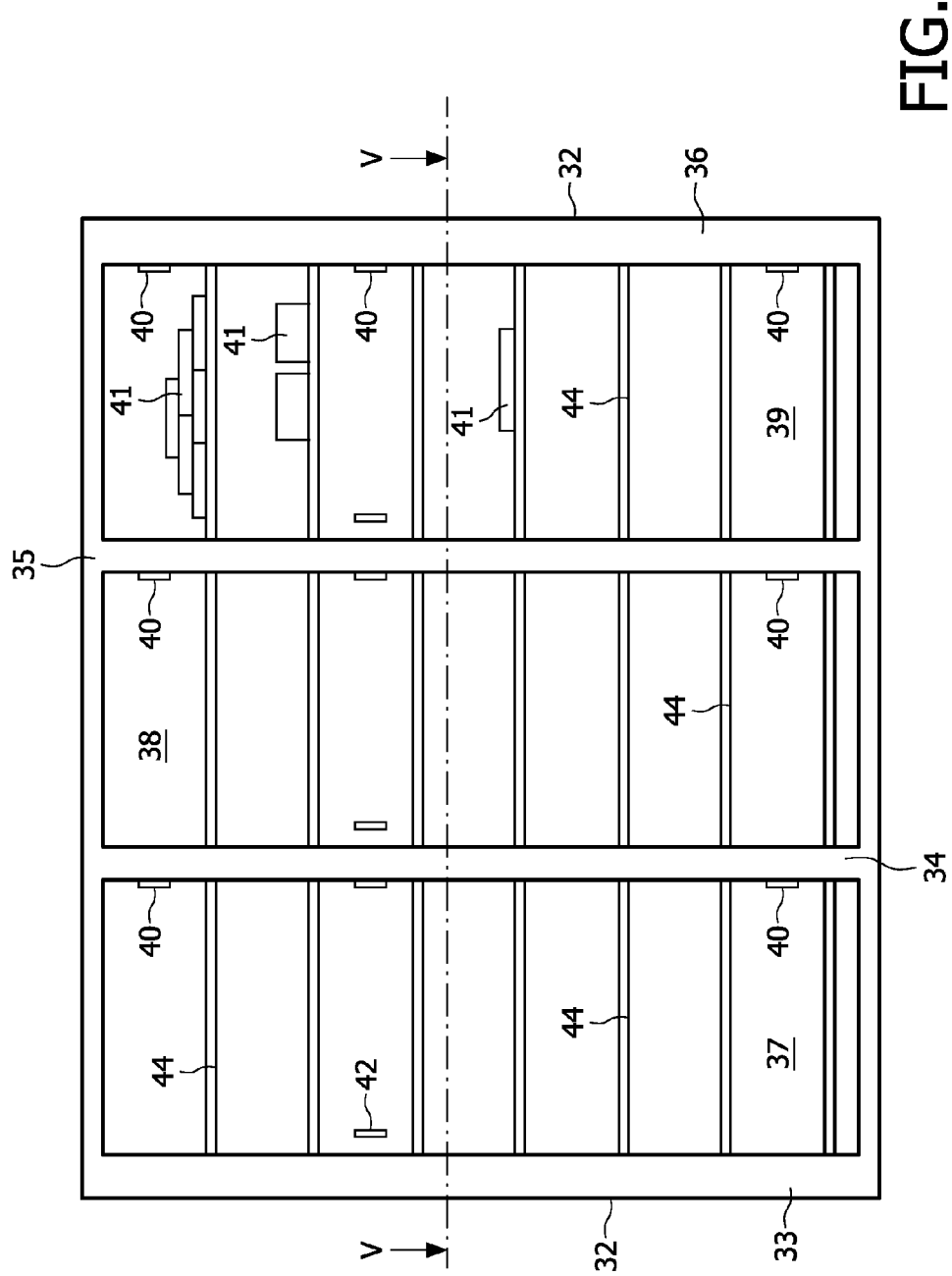
FIG. 4 is a front view of a freezer cupboard.
Figure 5:
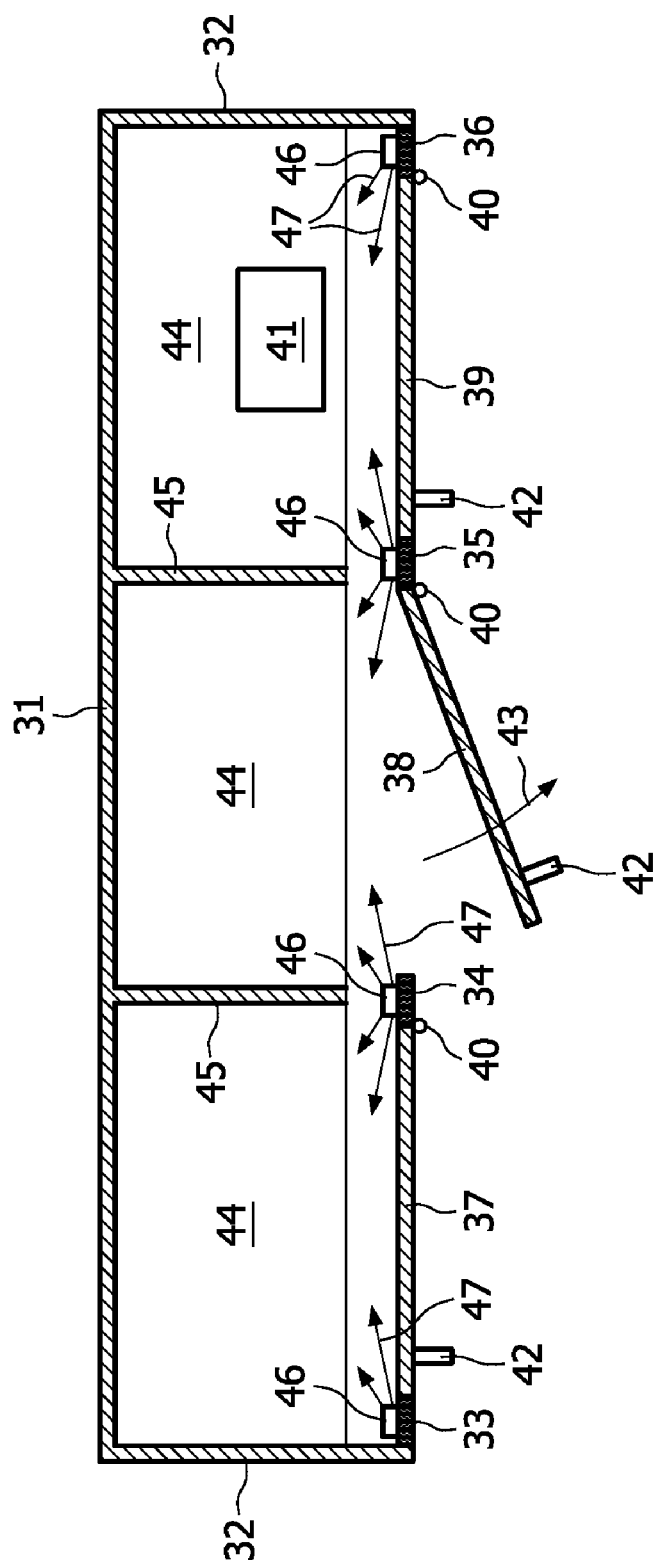
FIG. 5 is a sectional view according to line V-V in FIG. 4.

In particular, the elongated luminaire can be used for illuminating merchandise in a cupboard freezer, as is shown in FIGS. 4 and 5. FIG. 4 shows the front side of the cupboard freezer, and FIG. 5 is a horizontal sectional view, indicated with the arrows V in FIG. 4. The cupboard freezer has a vertical back wall 31 and two vertical side walls 32. At the front side, the freezer has four door cheeks 33,34,35,36 and three transparent doors 37,38,39, hingingly connected to the door cheeks by means of hinges 40.

The merchandise 41 inside the cupboard freezer is approachable by opening the doors 37,38,39 by means of handles 42, as is shown for door 38 in FIG. 5, indicated by arrow 43. The merchandise 41 is exposed for sale on shelves 44, which shelves 44 are carried by the side walls 32 and vertical partition walls 45. The partition walls 45 do not extend to the front side of the cupboard interior, so that the temperature in the cupboard freezer as a whole can be controlled.

According to the invention, a number of elongated luminaires 46 are mounted on the back side of the door cheeks 33,34,35,36. As indicated with arrows 47, light radiation from the luminaires 46 illuminates the merchandise 41. As a result, all the merchandise 41, also the merchandise in the middle of the shelves 44, is illuminated from two sides, thereby preventing inconvenient shadows in the cupboard freezer, and ensuring optimal horizontal light uniformity. One long luminaire 46 may be mounted behind each door cheek 33,34,35, 36, but also more luminaires 46 arranged in a line can be mounted.

The described embodiments of the invention are only examples of an elongated luminaire and a freezer cupboard according to the invention. Many other embodiments are possible.

The invention claimed is:

1. An elongated luminaire, comprising:
 a plurality of side-emitting LEDs disposed in at least one linear array mounted on an elongated base plate; and
 at least two generally flat reflectors extending from said base plate at each side along and generally parallel to said linear array, each reflector having a profiled reflecting surface, wherein a ratio between a shortest distance (L) between the base plate and a top edge of said reflectors and a height of said plurality of side-emitting LEDs ranges from ¾ to 1 and wherein said profiled reflecting surface includes a plurality of undulations generally propagated towards the array of LEDs.

2. An elongated luminaire as claimed in claim 1, wherein the profiled reflecting surface is inclined with respect to the base plate.

3. An elongated luminaire as claimed in claim 1, wherein the reflecting surface of each of the reflectors diverge with respect to each other at an angle between 0° and 60°.

4. An elongated luminaire as claimed in claim 1, wherein the reflecting surfaces of each of the reflectors are generally symmetrical relative to said linear array.

5. An elongated luminaire as claimed in claim 1, further comprising a transparent cover plate disposed at the side of the luminaire opposite to the base plate, interconnecting the edges of the reflectors facing away from the base plate.

\* \* \* \* \*